United States Patent
Kondo et al.

(10) Patent No.: US 8,184,985 B2
(45) Date of Patent: May 22, 2012

(54) CONTROL CIRCUIT FOR OPTICAL TRANSMITTER/RECEIVER

(75) Inventors: Harufusa Kondo, Tokyo (JP); Tetsuhiro Fukao, Tokyo (JP); Mutsumi Nakamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 884 days.

(21) Appl. No.: 12/205,945

(22) Filed: Sep. 8, 2008

(65) Prior Publication Data

US 2009/0279885 A1  Nov. 12, 2009

(30) Foreign Application Priority Data

May 9, 2008 (JP) ................................. 2008-123902

(51) Int. Cl.
*H04B 10/00* (2006.01)
(52) U.S. Cl. ...................... 398/138; 398/135; 398/139
(58) Field of Classification Search ........... 398/135–139
See application file for complete search history.

(56) References Cited

U.S. PATENT DOCUMENTS

| 6,941,077 | B2 * | 9/2005 | Aronson et al. | 398/137 |
| 7,058,310 | B2 * | 6/2006 | Aronson et al. | 398/137 |
| 7,079,775 | B2 * | 7/2006 | Aronson et al. | 398/137 |
| 7,149,430 | B2 * | 12/2006 | Hosking et al. | 398/137 |

FOREIGN PATENT DOCUMENTS

WO   WO 02/063800 A1   8/2002

* cited by examiner

*Primary Examiner* — Agustin Bello
(74) *Attorney, Agent, or Firm* — Leydig, Voit & Mayer, Ltd.

(57) ABSTRACT

A control circuit for an optical transmitter/receiver that transmits/receives an optical signal, comprises: a memory having a digital value storage area and an area that stores limit values; a register; an analog/digital conversion circuit that receives analog signals indicating operating parameters of the optical transmitter/receiver, converts the analog signals to respective digital values, and stores the digital values in the memory; a comparison logical circuit that compares the digital values with the limit values, generates flag values, and stores the flag values in the register; and an outside interface that allows an outside host apparatus to access the memory and the register to read the flag values and monitor an operating condition of the optical transmitter/receiver from outside.

2 Claims, 4 Drawing Sheets

CONTROL CIRCUIT FOR OPTICAL TRANSMITTER/RECEIVER

BACKGROUND OF THE INVENTION

1. Field of the Invention

The present invention relates to a control circuit for an optical transmitter/receiver that transmits an operating condition of the optical transmitter/receiver to an outside host apparatus, and more particularly, to a control circuit for an optical transmitter/receiver capable of saving an amount of memory.

2. Background Art

Optical transmitters/receivers that transmit/receive optical signals are widely used in optical communications using optical fiber or the like. There is a proposal of a control circuit for such an optical transmitter/receiver having a monitoring function that transmits an operating condition of the optical transmitter/receiver to an outside host apparatus (e.g., see Patent Document 1: Japanese Patent No. 3822861).

Optical transmitters/receivers are designed based on an industry standard called "Multi-Source Agreement" represented by XFP and SFP. Since products whose externally viewed interfaces and functions are standardized compete with each other on the market, these optical transmitters/receivers are extremely cost-sensitive. Furthermore, a hard wired microcontroller may be used as a control circuit for such an optical transmitter/receiver. The cost of this microcontroller tends to increase as the amount of memory mounted increases, and therefore it is necessary to use a microcontroller having the smallest possible amount of memory.

The control circuit for an optical transmitter/receiver in Patent Document 1 secures in a memory not only an area that stores an operating condition and a predetermined limit value of the optical transmitter/receiver but also an area that stores a flag produced when the operating condition exceeds the limit value. For this reason, there is a problem that as the number of parameters to be monitored such as temperature, bias, supply voltage, power of optical output, light-receiving power of the optical transmitter/receiver increases, both the necessary amount of memory and the cost increase.

Furthermore, in the case where the optical transmitter/receiver is provided with a function of reporting "Warning" when the operating condition exceeds a first limit value and "Alarm" when the operating condition exceeds a next second limit value, it is necessary to secure memory areas for five items of the operating condition, first limit value, second limit value, Warning flag and Alarm flag, which results in a problem that the amount of memory further increases.

SUMMARY OF THE INVENTION

The present invention has been implemented to solve the above described problems and it is an object of the present invention to provide a control circuit for an optical transmitter/receiver capable of saving the amount of memory.

According to one aspect of the present invention, a control circuit for an optical transmitter/receiver that transmits/receives an optical signal, comprises: a memory having a digital value storage area and an area that stores predetermined limit values; a register; an analog/digital conversion circuit that receives a plurality of analog signals indicating operating parameters on an operating characteristic or environment of the optical transmitter/receiver from the optical transmitter/receiver, converts the analog signals to their respective digital values and stores the digital values in the digital value storage area in the memory; a comparison logical circuit that compares the plurality of digital values with the limit values respectively corresponding thereto, generates flag values corresponding to the comparison results and stores the flag values in the register; and an outside interface that allows an outside host apparatus to access the memory and the register according to a command and an address received from the host apparatus, wherein the host apparatus is caused to read the flag values so as to allow an operating condition of the optical transmitter/receiver to be monitored from outside.

The present invention can save the amount of memory.

Other and further objects, features and advantages of the invention will appear more fully from the following description.

DETAILED DESCRIPTION OF THE PREFERRED EMBODIMENTS

First Embodiment

Figure 1:
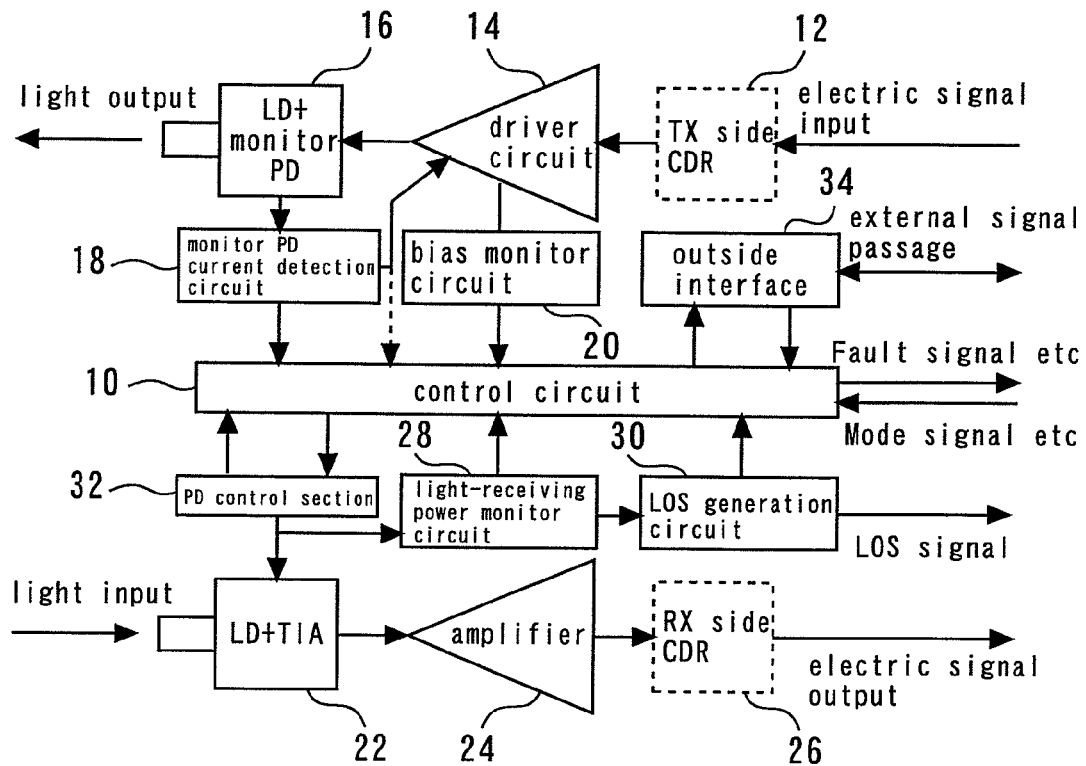
FIG. 1 is a block diagram showing an optical transmitter/receiver according to a first embodiment.

FIG. 1 is a block diagram showing an optical transmitter/receiver according to a first embodiment. This optical transmitter/receiver is intended to transmit/receive an optical signal. A control circuit 10 has a monitoring function that detects beforehand gradual deterioration of temperature, bias, supply voltage, power of optical output, light-receiving power or the like of the optical transmitter/receiver due to ageing or the like and transmits the deterioration to an outside host apparatus.

First, the transmitting circuit side will be explained. A TX side CDR (Clock Data Recovery) circuit 12 extracts a clock from an inputted electric signal and retimes data. Such a CDR circuit is not necessary for a 2R (reshaping and retransmission) transmitter/receiver such as an SFP, whereas the CDR circuit is necessary for a 3R (reshaping, retransmission and retiming) transmitter/receiver such as an XFP. Furthermore, the CDR circuit often incorporates an EQ (equalizer) for correcting a transmission path characteristic of an electric signal.

A driver circuit 14 amplifies an output signal of the TX side CDR circuit 12, gives the output signal to a laser diode (LD) 16 and drives the LD 16. The LD 16 is provided with a monitor photodetector (PD) that receives branched rear light or front light. By detecting the current of this monitor PD using a monitor PD current detection circuit 18, it is possible to estimate output optical power of the LD 16. Furthermore, by detecting the current of the monitor PD and providing feedback to a modulated current or bias of the driver circuit 14, it is possible to form an APC (Automatic Power Control) circuit having a feedback loop which keeps the optical output of the LD16 constant. When a DFB laser or the like is used as the LD 16, such an APC circuit is often provided. The monitor PD current detection circuit 18 transmits the current of the monitor PD to the control circuit 10 and a bias monitor circuit 20 transmits the bias current or modulated current of the driver circuit 14 to the control circuit 10.

Next, the receiving circuit side will be explained. An optical input is converted to an electric signal by a photodiode (PD) 22. This electric signal is converted to a voltage signal having large amplitude by a TIA (Trans-Impedance Amplifier) in PD ROSA (Receive Optical Sub-Assembly). An amplifier 24 amplifies the output signal of the PD 22 to a large amplitude electric signal on the order of several hundreds of mV, which is valid even outside the optical transmitter/receiver. The output signal of the amplifier 24 is outputted to the outside through an RX side CDR circuit 26. Various types of amplifier can be used as the amplifier 24 depending on the type of the optical transmitter/receiver such as an AGC amplifier and limiting amplifier.

A light-receiving power monitor circuit 28 measures light-receiving power of the PD22 and transmits the light-receiving power to control circuit 10. Furthermore, a LOS generation circuit 30 generates a LOS (Loss Of Signal) signal when the light-receiving power of the PD22 is smaller than a certain value. The behavior of the LOS generation circuit 30 is also transmitted to the control circuit 10.

Furthermore, an APD (avalanche PD) may also be used instead of the PD22. In this case, a PD control section 32 needs to control the APD voltage so that the amplification factor of the APD becomes adequate.

The control circuit 10 compares, for example, the bias current of the transmitting side with an upper limit or a lower limit, outputs a TX_FAULT signal to the outside when the bias current exceeds the upper limit or falls below the lower limit and informs that the own circuit is under abnormal conditions. Additionally, an interrupt signal may also be outputted to inform an outside apparatus of the abnormality.

The control circuit 10 receives a mode signal from the outside. The control circuit 10 then switches the setting of a programmable filter incorporated in the amplifier 24 on the receiving side according to the mode. In the case where the optical transmitter/receiver is a multi-rate compatible transmitter/receiver or the like that covers an operating frequency ranging from a low rate to high rate, setting a filter band corresponding to the low rate makes it possible to cut high-frequency noise and gain reception sensitivity.

The control circuit 10 monitors the operating characteristic or environment of the optical transmitter/receiver, compares the value with a limit value and generates a flag value corresponding to the comparison result. This flag value is stored in the control circuit 10 and can be read from outside through an outside interface 34 by specifying the address thereof. The monitoring function of this control circuit 10 will be explained in detail later.

The above described optical transmitter/receiver receives one electric signal or two electric signals making up a differential pair. In addition to this, the optical transmitter/receiver can also receive a plurality of low-rate signals. In this case, the TX side CDR circuit 12 or a separately provided MUX circuit needs to be provided with a MUX function that converts a plurality of low-rate signals to high-rate signals. Furthermore, part of the above described optical transmitter/receiver can also be omitted. For example, the monitor circuit need not always be provided. A photodetector may also be used instead of the PD 22.

Figure 2:
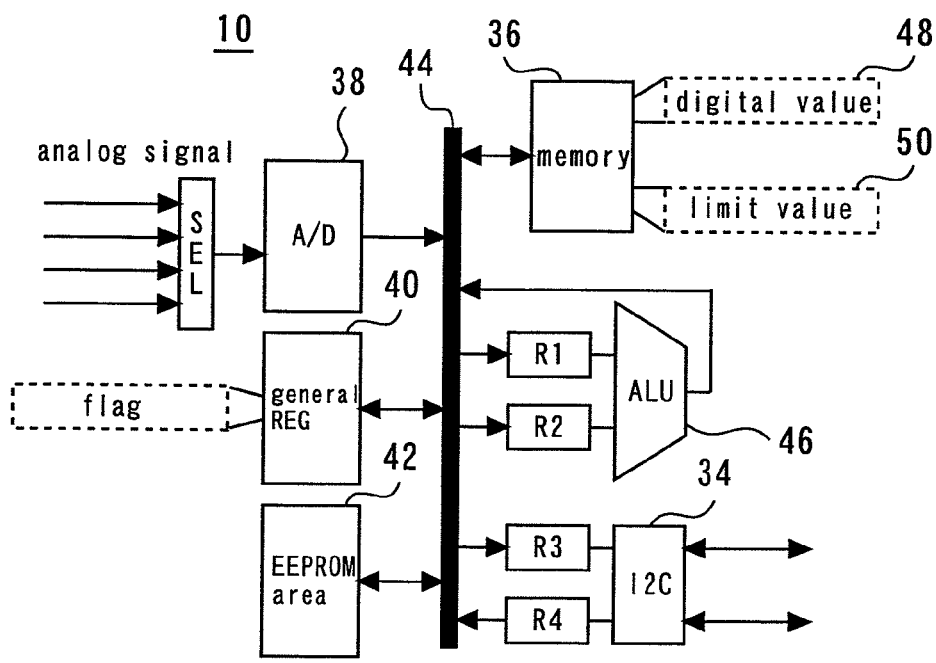
FIG. 2 is a block diagram showing a control circuit for an optical transmitter/receiver according to the first embodiment.

FIG. 2 is a block diagram showing a control circuit for an optical transmitter/receiver according to the first embodiment. The control circuit 10 is constructed of a one-chip microcontroller or an external memory and a microcontroller or the like.

A memory 36, an output of an analog/digital conversion circuit 38, a general register 40 (register), registers R1 to R4 and an EEPROM area 42 are connected to a bus 44 in the microcontroller. The registers R1 and R2 connect a comparison logical circuit 46 which is an arithmetic logic unit (ALU) in the microcontroller and the bus 44. The outside interface 34 is an I2C bus and the registers R3 and R4 connect this outside interface 34 and the bus 44 in the microcontroller. The outside interface 34 is not limited to the I2C bus, but may be other interface. Furthermore, though not shown, a digital/analog conversion circuit is provided to transmit an analog signal from the control circuit 10 to the outside. However, when a digital signal is transmitted to the outside, the IO of the microcontroller is used.

The memory 36 has a digital value storage area 48 and an area 50 that stores predetermined limit values. The EEPROM area 42 may also be constructed of a nonvolatile memory area incorporated in the microcontroller or may also be constructed of a nonvolatile memory such as a flash memory outside the microcontroller through a memory interface.

The analog/digital conversion circuit 38 receives a plurality of analog signals indicating operating parameters on the operating characteristic or environment of the optical transmitter/receiver from the optical transmitter/receiver, converts the respective analog signals to digital values and stores the digital values in the digital value storage area 48 in the memory 36. Examples of the analog signals include monitor values such as temperature, bias current of the driver, bias voltage of the APD, supply voltage, output power and light-receiving power. The analog/digital conversion circuit 38 is incorporated in the microcontroller here, but the present invention is not limited to this and may also be provided outside and made to communicate with the microcontroller.

The comparison logical circuit 46 compares a plurality of digital values with the limit values respectively corresponding thereto, generates flag values corresponding to the comparison results respectively and stores these flag values in the general register 40. The outside interface 34 allows an outside host apparatus (not shown) to access the memory 36 and general register 40 according to a command and address received from the host apparatus. The control circuit 10 including the above described configuration causes the host apparatus to read the flag values and thereby allows the operating condition of the optical transmitter/receiver to be monitored from outside.

The operation of the above described control circuit 10 will be explained. First, the entire general register 40 is used for general purposes at the time of initialization. During normal operation processing after initialization is completed, the amount of approximately three bytes of the general register 40 is used for only Warning/Alarm flag values.

The analog/digital conversion circuit 38 periodically converts an analog signal to a digital value based on a cycle time of a sequencer of the control circuit 10 or the like and stores the digital value in the digital value storage area 48 in the memory 36. Furthermore, the analog/digital conversion circuit 38 also reads a limit value from the area 50 of the memory 36 to the register R1 at a predetermined interval and reads a digital value from the digital value storage area 48 of the memory 36 to the register R2. The comparison logical circuit 46 then compares both register values, generates a flag value corresponding to the comparison result and stores this flag value in the general register 40. When an I2C interrupt is introduced from an outside host apparatus and a Warning/Alarm read command is given, the comparison logical circuit 46 reads a flag value from the general register 40 to the outside apparatus. When a command for reading other information is given, the comparison logical circuit 46 reads the information from the memory 36.

As explained so far, according to this embodiment, the flag value obtained by the comparison logical circuit 46 is stored in the general register 40. Since the general register 40 is not the memory 36, the amount of memory of the memory 36 can be saved. Furthermore, while a write to the memory 36 normally takes several cycles for a general microprocessor, a write to the general register 40 takes one cycle, and therefore the speed of a flag generation routine can be enhanced.

Furthermore, the microcontroller is normally provided with a peripheral circuit in addition to the general register 40. Examples of the peripheral circuit include a timer, counter, GPIO (General Purpose Input Output), ADC (Analog to Digital Converter) and DAC (Digital to Analog Converter). These peripheral circuits each have a register to control themselves. For example, when a value is set in a DAC register, an analog output corresponding to the value is obtained. When there is an unused peripheral circuit in the control circuit 10, similar effects can be obtained by also storing a flag value in a register of the unused peripheral circuit instead of the general register 40.

Furthermore, there are various types of flag value and each flag value usually has an upper limit value and a lower limit value as shown in Table 1. Furthermore, when two levels of "Alarm" indicating a critical state and "Warning" indicating a danger are set in each flag value, twenty flag values are necessary.

TABLE 1

| The kind of flag value | |
| --- | --- |
| Temperature Alarm in the case of being lower than a lower limit | Temperature Alarm in the case of being higher than an upper limit |
| Bias Alarm in the case of being lower than a lower limit | Bias Alarm in the case of being higher than an upper limit |
| Supply voltage Alarm in the case of being lower than a lower limit | Supply voltage Alarm in the case of being higher than an upper limit |
| Optical output Alarm in the case of being lower than a lower limit | Optical output Alarm in the case of being higher than an upper limit |
| Light-receiving power Alarm in the case of being lower than a lower limit | Light-receiving power Alarm in the case of being higher than an upper limit |
| Temperature warning in the case of being lower than a lower limit | Temperature warning in the case of being higher than an upper limit |
| Bias warning in the case of being lower than a lower limit | Bias warning in the case of being higher than an upper limit |
| Supply voltage warning in the case of being lower than a lower limit | Supply voltage warning in the case of being higher than an upper limit |
| Optical output warning in the case of being lower than a lower limit | Optical output warning in the case of being higher than an upper limit |
| Light-receiving power warning in the case of being lower than a lower limit | Light-receiving power warning in the case of being higher than an upper limit |

In Table 1, a case where a value is lower than a lower limit and a case where the value is higher than an upper limit do not occur simultaneously. When such situations that never occur simultaneously are taken into consideration, flag values can be data-compressed as shown in Table 2. These flag values include a flag indicating that the digital value corresponding thereto is outside a Warning range (first range), a flag indicating that the digital value corresponding thereto is outside an Alarm range (second range) which is wider than the Warning range and a flag indicating that the digital value corresponding thereto is higher than the upper limit of the Alarm range or Warning range or lower than the lower limit thereof.

TABLE 2

| The kind of data-compressing flag values | | |
| --- | --- | --- |
| Existence of Temperature Alarm | Existence of Temperature Warning | An upper limit or a lower limit |
| Existence of Bias Alarm | Existence of Bias Warning | An upper limit or a lower limit |
| Existence of Supply voltage Alarm | Existence of Supply voltage Warning | An upper limit or a lower limit |
| Existence of Optical output Alarm | Existence of Optical output Warning | An upper limit or a lower limit |
| Existence of Light-receiving power Alarm | Existence of Light-receiving power Warning | An upper limit or a lower limit |

By data-compressing flag values in this way, the number of required flag values is reduced to 15, and the amount of memory can be thereby saved. The greater the number of types of flag value, the greater is the effect of saving, too. Furthermore, when data of the twenty flag values in Table 1 are required to be read from the outside host apparatus, it is possible to calculate the required data through logical operations from the fifteen flag values in Table 2.

Second Embodiment

Figure 3:
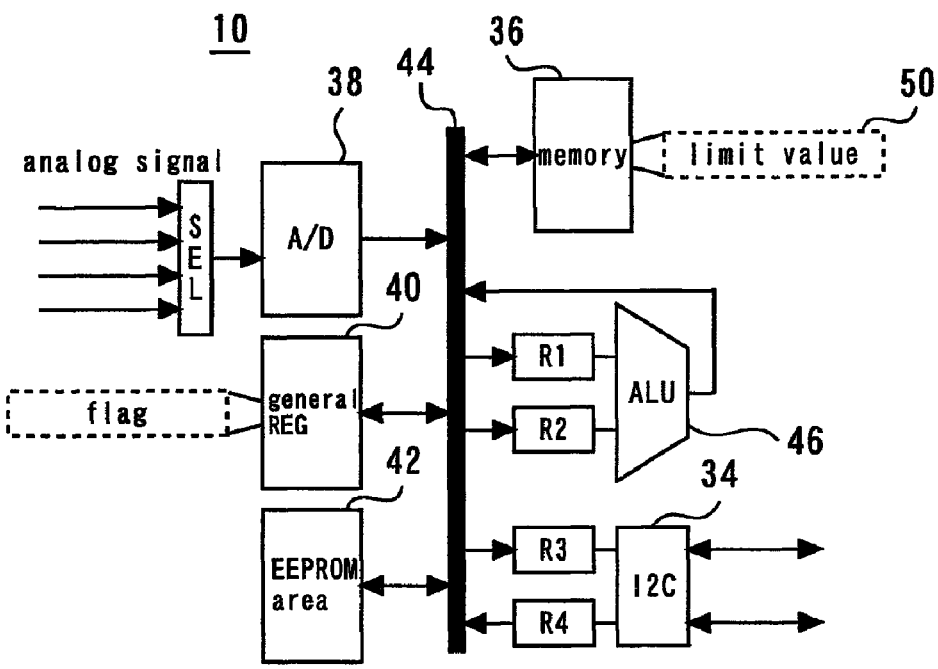
FIG. 3 is a block diagram showing a control circuit for an optical transmitter/receiver according to a second embodiment.

FIG. 3 is a block diagram showing a control circuit for an optical transmitter/receiver according to a second embodiment. An analog/digital conversion circuit 38 converts an analog signal to a digital signal like the first embodiment, but does not store this digital signal in a memory 36. Upon receiving a request for reading an analog signal from an outside host apparatus, a control circuit 10 generates an interrupt, and the analog/digital conversion circuit 38 converts the analog signal to a digital value and causes the host apparatus to read the analog signal through an outside interface 34 (I2C). The rest of the configuration is the same as that of the first embodiment.

Here, since a digital value normally has 8 bits or 16 bits, a digital value storage area 48 that stores digital values obtained by A/D-converting, for example, five analog signals has 5 bytes and 10 bytes respectively. This embodiment can omit the digital value storage area 48 by not storing any digital signal in the memory 36 and can thereby save the amount of memory. Such saving of the amount of memory becomes more effective as the number of analog signals increases.

Here, the analog signal when a flag value is calculated may be subtly different from the analog signal requested from the host apparatus. However, because the analog signal has the nature that its value does not change suddenly, this constitutes no problem. That is, when an abnormal state occurs suddenly, the signal is transmitted to the host apparatus separately without passing through the control circuit 10, and therefore such an abnormal state has no significant effect.

Third Embodiment

Figure 4:
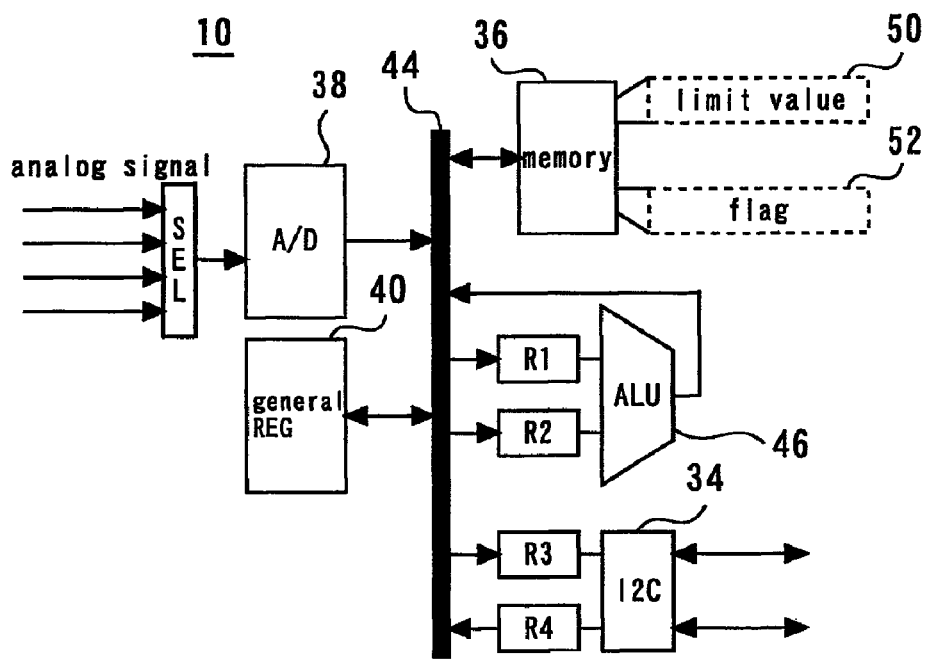
FIG. 4 is a block diagram showing a control circuit for an optical transmitter/receiver according to a third embodiment.

FIG. 4 is a block diagram showing a control circuit for an optical transmitter/receiver according to a third embodiment.

An analog/digital conversion circuit 38 does not store any digital signal in a memory 36 like the second embodiment. Upon receiving a request for reading an analog signal from an outside host apparatus, a control circuit 10 generates an interrupt and the analog/digital conversion circuit 38 converts the analog signal to a digital value and causes the host apparatus to read the digital value through an outside interface 34 (I2C).

Unlike the second embodiment, the memory 36 has not only an area 50 that stores predetermined limit values but also a flag storage area 52 that stores flag values. A comparison logical circuit 46 generates a flag value and stores this flag value in the flag storage area 52 in the memory 36 like the first and second embodiments. The control circuit 10 causes the host apparatus to read the flag value, and thereby allows an operating condition of the optical transmitter/receiver to be monitored from outside.

Providing the flag storage area 52 in the memory 36 in this way increases the memory area compared to the first and second embodiments. However, like the second embodiment, it is possible to omit a digital value storage area 48 in the memory 36 by not storing any digital signal in the memory 36 and thereby save the amount of memory.

Fourth Embodiment

Figure 5:
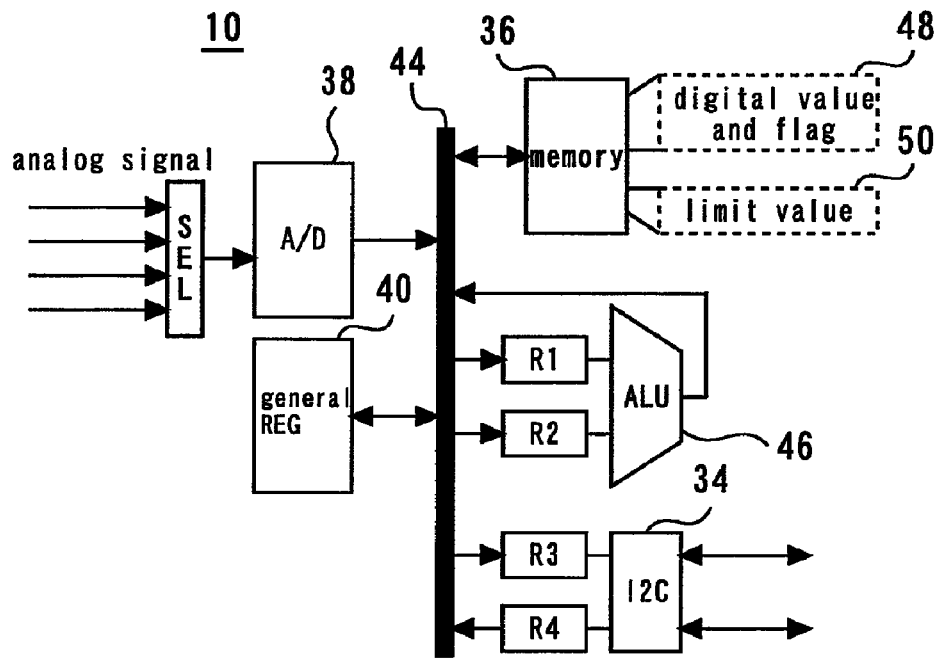
FIG. 5 is a block diagram showing a control circuit for an optical transmitter/receiver according to a fourth embodiment.

FIG. 5 is a block diagram showing a control circuit for an optical transmitter/receiver according to a fourth embodiment.

A memory 36 has a digital value storage area 48 and an area 50 that stores predetermined limit values. An analog/digital conversion circuit 38 converts an analog signal to a digital value at a predetermined interval and stores the digital value in a register R1 and the digital value storage area 48 in the memory 36.

A comparison logical circuit 46 reads a limit value from the area 50 of the memory 36 to a register R2, compares a plurality of digital values with the limit values respectively corresponding thereto and reverses positive/negative signs of digital values in the memory 36 according to the comparison results. More specifically, the comparison logical circuit 46 does nothing when the comparison result is "OK," reads the digital value from the digital value storage area 48 of the memory 36 when the comparison result is "NG," reverses positive/negative signs (takes 2's complement in the case of a binary number) and rewrites the result into the original address. Therefore, a digital value means "NG" if the value is negative and "OK" if positive.

An outside interface 34 allows an outside host apparatus to access the memory 36 according to a command and address received from the host apparatus. A control circuit 10 causes the host apparatus to read the positive/negative sign of a digital value, and thereby allows an operating condition of the optical transmitter/receiver to be monitored from outside.

For example, the control circuit 10 generates a one-byte flag value through an ALU operation such as reading MSBs (Most Significant Bit) from eight addresses of the digital value storage area 48, and shifting and ORing the MSBs, and then returns the operation result to the host apparatus through the outside interface 34.

By reversing the positive/negative sign of the digital value in the memory 36 instead of storing a flag value in the memory 36, it is possible to save the amount of memory while maintaining information equivalent to the flag value.

Fifth Embodiment

In this embodiment, a comparison logical circuit 46 stores a flag value in the least significant bit (one bit or two bits from the least significant bit) of a digital value in a memory 36. A control circuit 10 causes a host apparatus to read the flag value and thereby allows an operating condition of the optical transmitter/receiver to be monitored from outside. The rest of the configuration is the same as that of the fourth embodiment.

Since no area dedicated to flag values needs to be provided in the memory 36, the amount of memory can be saved. However, when two bits from the least significant bit of, for example, a 16-bit digital value are assigned to the flag value, the accuracy of the digital value is lost by two LSBs (Least Significant Bit). However, because the deterioration of accuracy is nothing more than 0.006% of the full range of 16 bits, this constitutes no problem.

Sixth Embodiment

Figure 6:
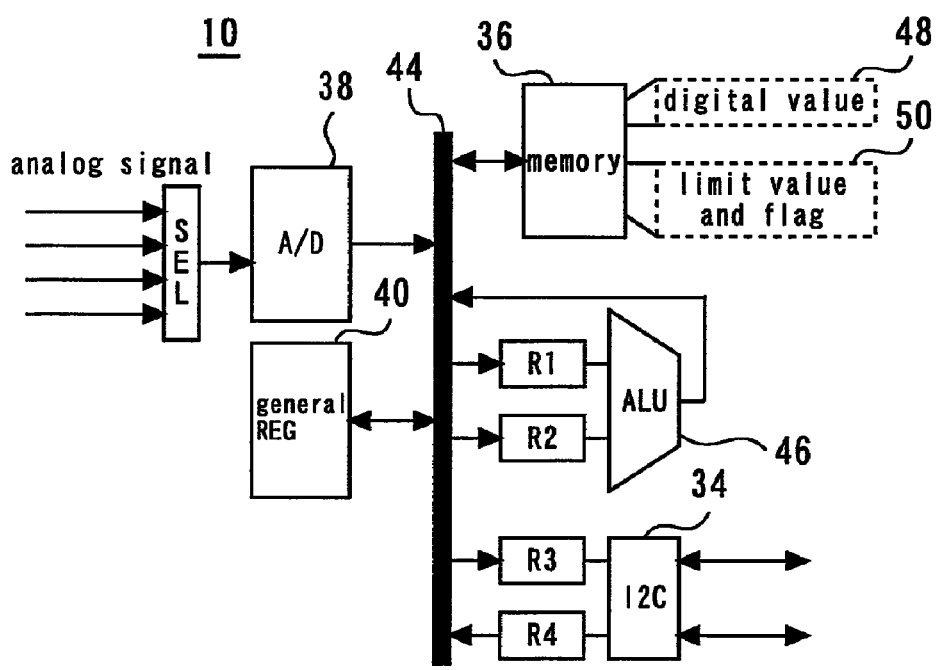
FIG. 6 is a block diagram showing a control circuit for an optical transmitter/receiver according to a sixth embodiment.

FIG. 6 is a block diagram showing a control circuit for an optical transmitter/receiver according to a sixth embodiment.

In this embodiment, a comparison logical circuit 46 compares a plurality of digital values with the limit values respectively corresponding thereto and reverses positive/negative signs of limit values in a memory 36 according to the comparison results. A control circuit 10 causes a host apparatus to read the positive/negative signs of the limit values and thereby allows an operating condition of the optical transmitter/receiver to be monitored from outside. The rest of the configuration is the same as that of the fourth embodiment.

The fourth embodiment reverses the positive/negative sign of the digital value, but when there are a plurality of limit values (upper limit and lower limit, Alarm level and Warning level or the like), similar effects can be obtained even when the positive/negative sign of the limit value is reversed as in the case of this embodiment.

Instead of reversing the positive/negative sign of the limit value (processing of 2's complement), bits may be simply inverted. Such a case is equivalent to reversing the positive/negative sign depending on whether the MSB is 0 or 1.

Seventh Embodiment

Figure 7:
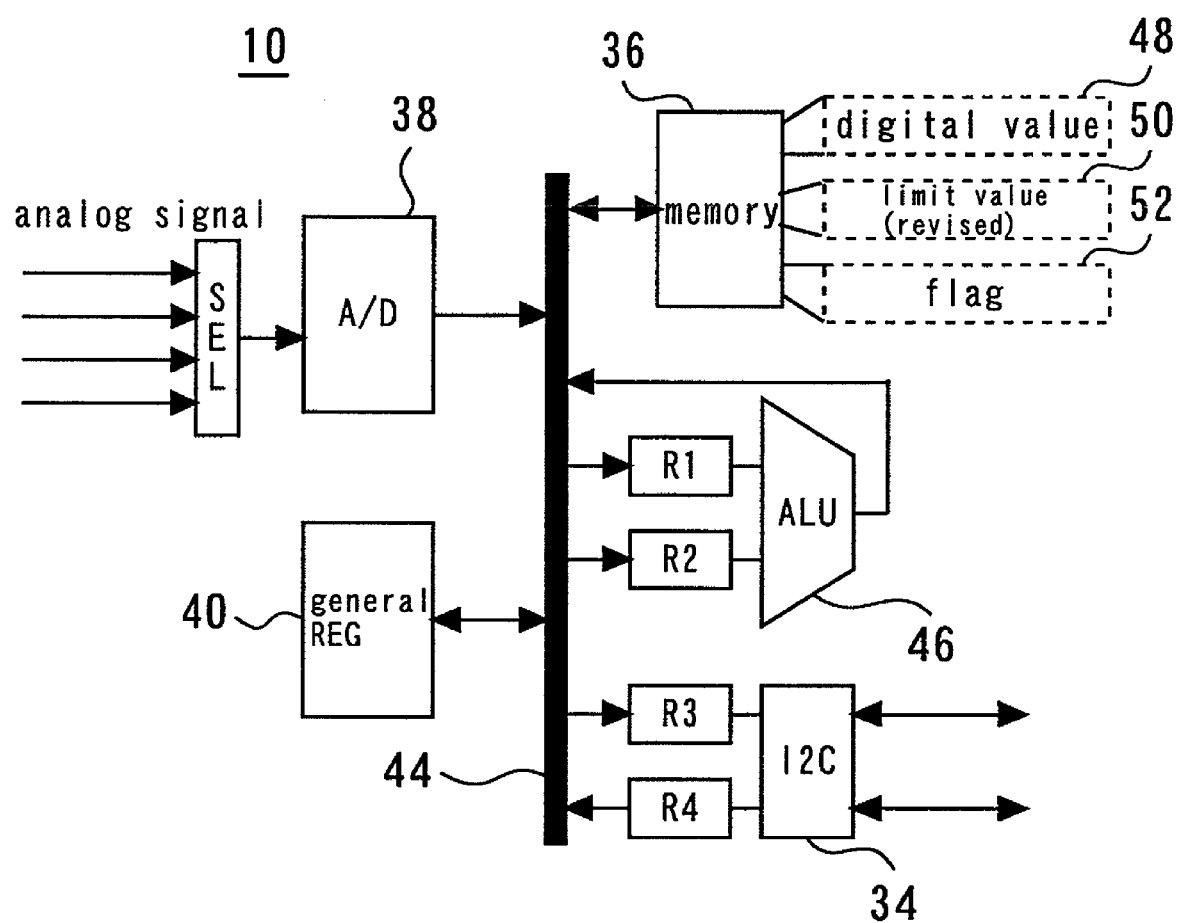
FIG. 7 is a block diagram showing a control circuit for an optical transmitter/receiver according to a seventh embodiment.

FIG. 7 is a block diagram showing a control circuit for an optical transmitter/receiver according to a seventh embodiment.

In this embodiment, a comparison logical circuit 46 adds up a plurality of digital values and the limit values respectively corresponding thereto, generates flag values corresponding to the presence/absence of an overflow in the result and stores these flag values in a flag storage area 52 in a memory 36. As a limit value, a value that would generate, when added to the digital value, an overflow in the comparison logical circuit 46 is set instead of, for example, 80° C. as an upper limit value of temperature. The rest of the configuration is the same as that of the fourth embodiment.

The operation of the control circuit 10 according to this embodiment will be explained. An analog/digital conversion circuit 38 converts an analog signal to a digital value at a predetermined interval and stores the digital value in a register R1 and a digital value storage area 48 in the memory 36. Next, the comparison logical circuit 46 reads the limit value from an area 50 of the memory 36 to a register R2 and adds up the digital value and limit value. When this calculation result overflows, an overflow flag value of the comparison logical circuit 46 is set, and therefore a flag value is then generated. When a command for reading a limit value is sent from an outside host apparatus, it is possible to output a correct limit value to the outside by reading the limit value from the memory 36 and sending a value subtracted from FFFF.

In the first to sixth embodiments, the comparison logical circuit 46 performs two-step operation doing a subtraction between a digital value and a limit value and judging whether the result is positive or negative. On the other hand, in this embodiment, the comparison logical circuit 46 can judge the flag value by only doing an addition between a digital value and a limit value and judging whether or not the result overflows, and can thereby make a comparison quickly.

The comparison logical circuit 46 may also be adapted so as to generate a flag value corresponding to the presence/absence of an underflow in the calculation result.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2008-123902, filed on May 9, 2008 including specification, claims, drawings and summary, on which the Convention priority of the present application is based, are incorporated herein by reference in its entirety.

What is claimed is:

1. A control circuit for an optical transmitter/receiver that transmits/receives an optical signal, comprising:
    a memory having a digital value storage area and an area that stores predetermined limit values;
    a register;
    an analog/digital conversion circuit that receives a plurality of analog signals indicating operating parameters related to an operating characteristic or environment of the optical transmitter/receiver, from the optical transmitter/receiver, converts the analog signals to respective digital values, and stores the digital values in the digital value storage area of the memory;
    a comparison logical circuit that compares the plurality of digital values with corresponding limit values stored in the memory, generates flag values corresponding to comparison results, and stores the flag values in the register, wherein each flag value consists of (i) a first flag indicating whether the digital value corresponding to the flag value is outside upper and lower limits of a first range, (ii) a second flag indicating whether the digital value corresponding to the flag value is outside upper and lower limits of a second range and the first range, the second range encompassing and being wider than the first range, and (iii) a third flag indicating whether the digital value corresponding to the flag value is higher than the upper limit of the first range and/or the second range indicated by the first and/or second flags or lower than the lower limit of the first range and/or the second range indicated by the first and/or second flags; and
    an outside interface that allows an outside host apparatus to access the memory and the register according to a command and an address received from the host apparatus, wherein the host apparatus reads the flag values to monitor an operating condition of the optical transmitter/receiver from outside.

2. The control circuit for an optical transmitter/receiver according to claim 1, wherein the register is a general register or a register of a peripheral circuit.

* * * * *